United States Patent
Choi

(10) Patent No.: US 8,166,154 B2
(45) Date of Patent: Apr. 24, 2012

(54) METHOD FOR STREAMING MULTIMEDIA CONTENT

(75) Inventor: Kyu-Tae Choi, Suwon-si (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 1279 days.

(21) Appl. No.: 11/180,237

(22) Filed: Jul. 13, 2005

(65) Prior Publication Data

US 2006/0075453 A1     Apr. 6, 2006

(30) Foreign Application Priority Data

Oct. 4, 2004   (KR) ......................... 10-2004-0078765

(51) Int. Cl.
  *G06F 15/173* (2006.01)
  *G06F 15/16* (2006.01)
  *H04N 7/16* (2011.01)
(52) U.S. Cl. ......... 709/224; 709/231; 709/238; 725/135
(58) Field of Classification Search .................. 709/231, 709/238, 224; 725/135
  See application file for complete search history.

(56) References Cited

U.S. PATENT DOCUMENTS

| | | | |
|---|---|---|---|
| 5,603,058 A * | 2/1997 | Belknap et al. ................. 710/35 |
| 5,712,976 A * | 1/1998 | Falcon et al. ................. 725/115 |
| 6,742,023 B1 * | 5/2004 | Fanning et al. ................ 709/219 |
| 6,829,634 B1 * | 12/2004 | Holt et al. ...................... 709/204 |
| 6,920,501 B2 * | 7/2005 | Chu et al. ....................... 709/228 |
| 6,996,627 B1 * | 2/2006 | Carden ......................... 709/237 |
| 7,027,460 B2 * | 4/2006 | Iyer et al. ...................... 370/429 |
| 7,039,784 B1 * | 5/2006 | Chen et al. .................... 711/170 |
| 7,174,385 B2 * | 2/2007 | Li ................................. 709/231 |
| 7,337,460 B1 * | 2/2008 | Fakharzadeh ................... 725/90 |
| 7,376,747 B2 * | 5/2008 | Hartop .......................... 709/233 |
| 2002/0059274 A1 * | 5/2002 | Hartsell et al. ................ 707/100 |
| 2002/0156917 A1 * | 10/2002 | Nye ............................. 709/238 |
| 2003/0204613 A1 * | 10/2003 | Hudson et al. ................ 709/231 |
| 2003/0212804 A1 * | 11/2003 | Hashemi ...................... 709/228 |
| 2005/0183120 A1 * | 8/2005 | Jain et al. ........................ 725/46 |
| 2006/0053209 A1 | 3/2006 | Li |

FOREIGN PATENT DOCUMENTS

| KR | 2004-47095 | 6/2004 |
|---|---|---|
| WO | WO 2004/075077 | 9/2004 |

* cited by examiner

*Primary Examiner* — Kevin Bates
*Assistant Examiner* — Robert B McAdams
(74) *Attorney, Agent, or Firm* — Cha & Reiter, LLC

(57) ABSTRACT

Streaming multimedia content from a content server to client, user multimedia devices (UMDs) connected to the content server through a network includes the steps of monitoring storage states, of UMDs connected to the network, for preset multimedia content, and automatically transmitting a starting block of the content to any UMD not yet storing the block. Tasks preparatory to streaming are advantageously off-loaded to the client side and distributed among UMDs, to realize reduced bandwidth and delay and to conserve on storage capacity of a UMD.

12 Claims, 4 Drawing Sheets

METHOD FOR STREAMING MULTIMEDIA CONTENT

CLAIM OF PRIORITY

This application claims priority to an application entitled "Method for Streaming Multimedia Content," filed in the Korean Intellectual Property Office on Oct. 4, 2004 and assigned Serial No. 2004-78765, the contents of which are incorporated herein by reference.

BACKGROUND OF THE INVENTION

1. Field of the Invention

The present invention relates to streaming multimedia content, and, more particularly, to distributing the function among clients in a client-server relationship.

2. Description of the Related Art

Video on demand (VoD) services include streaming service provided on the Internet, VoD service provided through cable TV broadcasting, etc. A currently provided VoD service usually has a transmission rate of no more than several hundreds kilobits per second (kbps) to 1 megabit per second (Mbps). However, a streaming service having a transmission rate of several Mbps is expected to gain widespread adoption by virtue of the broadband residential access network and the demand for high quality content.

In a typical streaming service provided through the Internet, when a user selects particular content, it is necessary that the content should be first buffered through an application program running on the UMD before being displayed on the UMD.

In a typical streaming service, although the particular content is delivered to a UMD from a content server in an end-to-end form, frequently accessed contents are previously placed up to a network edge in the case where a content delivery network (CDN), a cache server, etc. are employed. It is accordingly possible to prevent service failure that might otherwise occur due to overload of the content server and transmission delay through a network.

Among the recent developments in subscriber multimedia devices are high capability computers, high capacity storage media, personal video recorders (PVRs), etc. Consequently, in some Internet VoD services, when a user computer accesses a network, entire contents having been updated in a content server are automatically downloaded by an application program and stored at the user computer, enabling the user to select from among the stored contents for subsequent display or presentation.

However, the typical streaming service suffers delay caused by initial buffering and buffering when contents are skipped in reproduction.

Also, a content storage type VoD service requires a UMD having a large-capacity storage medium. In addition, since the device stores potentially a large amount content, it becomes necessary to implement the device with the additional protection capability.

SUMMARY OF THE INVENTION

The present invention has been made to solve the above-mentioned problems occurring in the prior art, and, in an aspect of the present invention, streaming occurs over a network, from a content server to user multimedia devices (UMDs) connected to the content server through the network. Storage states of the connected UMDs are monitored for a preset multimedia content. A starting block of the multimedia content that provided by the content server newly is transmitted to the UMD, automatically and without user intervention, if the UMD does not yet store the starting block.

According to another aspect of the present invention, streaming occurs over a network, from a content server to user multimedia devices (UMDs) connected to the content server through the network. Storage states of the connected UMDs are monitored for preset multimedia content. If a UMD requests the multimedia content, another of the UMDs is authorized to store an indexing block corresponding to the multimedia content, and to transmit the indexing block to a content-requesting UMD which requests the multimedia content. At least one of the monitoring and authorizing is performed by a computer without user intervention.

The shift of some streaming functionality from the server to the client side and distribution among the clients, in the manner to be described, reaps advantages as to reduced delay, conserved bandwidth and reduced storage requirements. For example, streaming in a trick mode, e.g., fast forward, reverse, can be accomplished with less buffer delay arising due to skipped contents. The time overhead of finding a starting block of desired content is reduced by pre-storing the starting blocks in the clients. On the other hand, the clients are relieved of mass storage, due to the distributed processing.

BRIEF DESCRIPTION OF THE DRAWINGS

The above features and advantages of the present invention will be more apparent from the following detailed description taken in conjunction with the accompanying drawings, in which the same or similar reference numbers appear throughout the several views.

DETAILED DESCRIPTION

In the following discussion of the present invention, detailed description of known functions and configurations incorporated herein is omitted for clarity of presentation.

Figure 1:
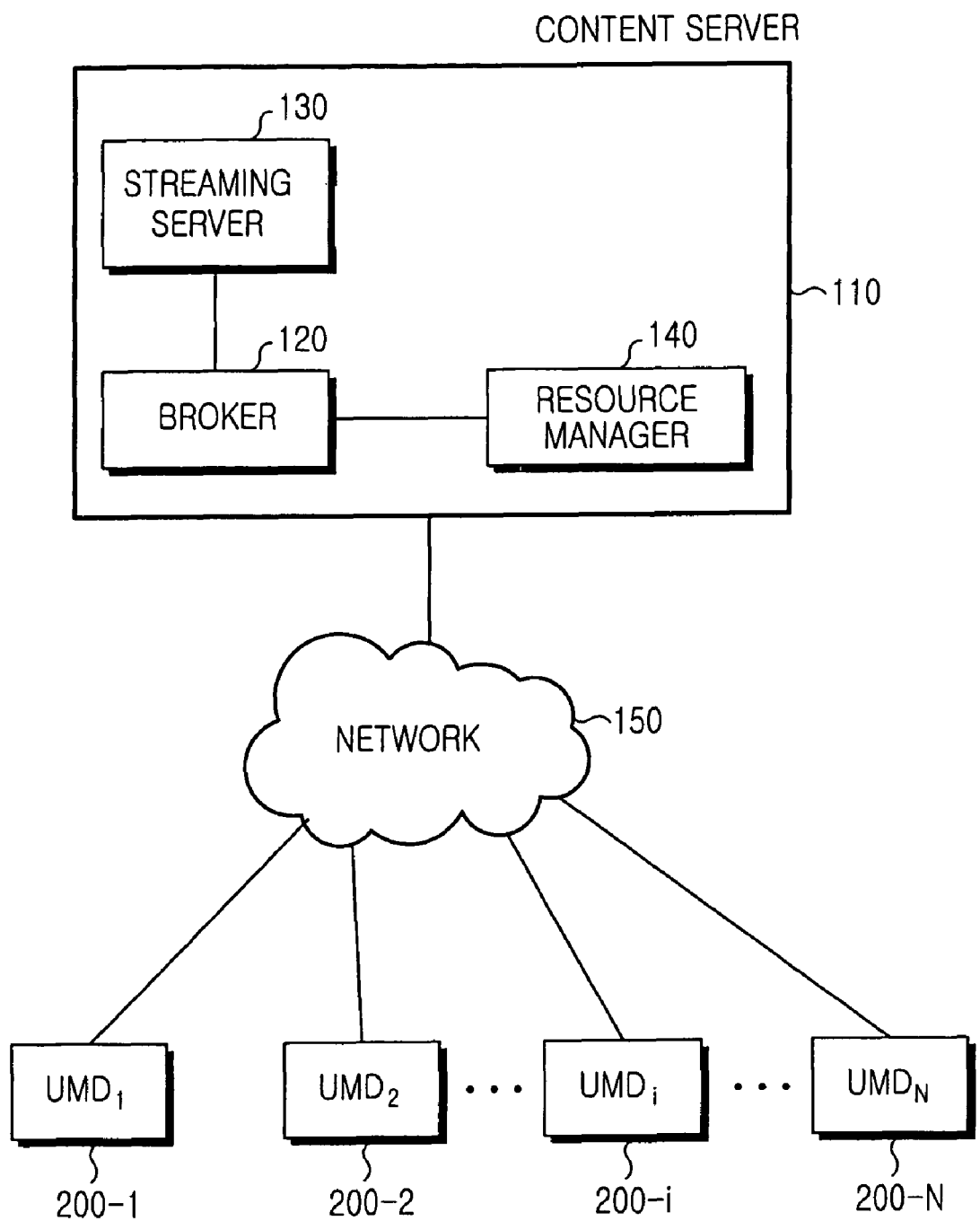
FIG. 1 is a block diagram showing an exemplary structure of a multimedia content streaming service system according to a preferred embodiment of the present invention.

FIG. 1 is a block diagram showing, by way of illustrative and non-limitative example, a multimedia content streaming service system according to a preferred embodiment of the present invention. The multimedia content streaming service system includes a content server 110 and a plurality of UMDs (UMDs) 200-1 to 200-N connected with the content server 110 through a network 150. The content server 110 includes a broker 120, a streaming server 130, and a resource manager 140.

The broker 120 periodically monitors storage states of the UMDs 200-1 to 220-$n$ connected to the network 150 for at least one preset, predetermined portion of multimedia content. The broker 120 monitors the storage state of each UMD 200-$i$ for a starting block of the multimedia content and types of indexing blocks of the multimedia content stored in each UMD 200-$i$. In addition, the broker 120 controls the streaming server 130 and a resource manager 140 and communicates with the UMDs 200-1 to 200-$n$.

The broker 120 performs mainly the following three steps.

First, when the UMD 200-*i* having authority is connected to the network 150, the broker 120 periodically monitors a storage state. This storage state can be of predetermined multimedia content stored in the streaming server 130, or the storage state of the multimedia content selected by a user 205-*i*, i.e., not to currently stream the multimedia content but to inform the content server 110 of the user's intention to be presented with the multimedia content in the future. The terms "selected" and "selection" hereinafter connote this meaning, when used in the context of a selection by the user 205-*i* for future presentation. Such a selection may be made when the user 205-*i* receives the authority from the content server 110.

After this first step, the following two steps are performed.

Firstly, when the UMD 200-*i* has no starting block of the multimedia content, and therefore a respective storage state for that starting block, the broker 120 automatically transmits the starting block to the UMD 200-*i*. More specifically, although the UMD 200-*i* does not currently reproduce a preset multimedia content, e.g., by having the content streamed in, the broker 120 allows the UMD 200-*i* to store the starting block of the multimedia content. Thus, since the UMD 200-*i* has already stored the starting block, a user 205-*i* can reproduce the multimedia content without initial buffering.

Secondly, when one 200-*i* of the UMDs 200-1 to 200-N requests the multimedia content, the broker 120 allows another UMD storing indexing blocks corresponding to the multimedia content to transmit the indexing blocks to the UMD 200-*i* having requested the multimedia content. In particular, the broker 120 transmits availability information regarding the indexing blocks (information regarding UMDs having stored the indexing blocks, i.e., the potential providers of the blocks) to the UMD 200-*i* and transmits session information (information about the UMD 220-*i* and information about indexing blocks waiting for transmission) to the UMDs included in the availability information. For any UMD 200-*i* for which the indexing blocks are not stored, the broker 120 allows or authorizes the streaming server 130 to transmit the indexing blocks to the UMD. As an additional function of the broker 120, it transmits multimedia blocks specified by the indexing blocks to the UMD 200-*i*.

The resource manager 140 stores information regarding the distribution of indexing blocks of the UMDs 200-1 to 200-N detected by the broker 120.

The streaming server 130 transmits a starting block, multimedia blocks, or indexing blocks and multimedia blocks to the corresponding multimedia device 200-*i* according to the control of the broker 120.

The indexing blocks of a preset multimedia content stored in the UMDs 200-1 to 200-N may be removed upon termination of authority. Otherwise, the indexing blocks may be maintained or removed by the broker 120 according to any indexing block management policy of the resource manager 140. For example, although authority is terminated, the resource manager 140 may allow the UMDs 200-1 to 200-N to maintain corresponding indexing blocks.

Figure 2:
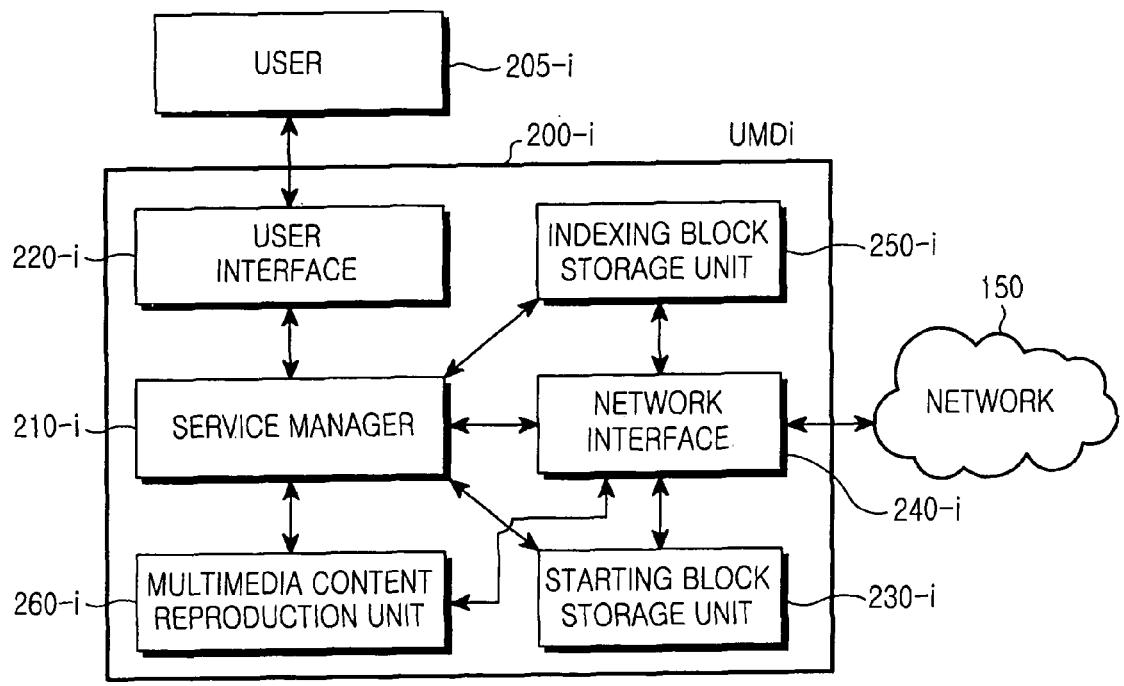
FIG. 2 is a block diagram of the UMD shown in FIG. 1.

FIG. 2 depicts details of an exemplary UMD. Each UMD 200-*i* includes a service manager 210-*i*, a user interface 220-*i*, a starting block storage unit 230-*i*, a network interface 240-*i*, an indexing block storage unit 250-*i*, and a multimedia content reproducing unit 260.

The service manager 210-*i* communicates with the broker 120 of the content server 110 and controls other components in the UMD. The service manager 210-*i* manages a starting block and indexing blocks, performs scheduling with respect to contents, communicates with the broker 120 and a user 200 other than its user 200-*i*, and controls a service of reproducing the contents.

The service manager 210-*i* performs the following four main steps.

First, if the service manager 210-*i* receives the request for content information from the content server 110, the service manager 210-*i* transmits information (i.e., the content information) about a starting block and indexing blocks of the stored content to the content server 110.

Second, if the service manager 210-*i* receives a starting block of a preset content from the content server 110, the service manager 210-*i* stores the starting block in the starting block storage unit 230-*i*, thereby enabling the UMD 200-*i* to instantaneously reproduce content without initial buffering when the UMD reproduces the content.

Third, the service manager 210-*i* temporarily stores corresponding indexing blocks from the content server 110 in the indexing block storage unit 250-*i* according to an indexing block management policy of the resource manager 140. After that, if the service manager 210-*i* receives session information from the broker 120 and if the service manager 210-*i* receives a request for transmission of all or a portion of the indexing blocks through peer-to-peer (P2P) communication with another UMD, the service manager 210-*i* transmits corresponding indexing blocks to the content-requesting UMD.

Fourth, the service manager 210-*i* allows the multimedia content reproduction unit 260-*i* to reproduce a starting block stored in the starting block storage unit 230-*i* according to a content reproduction request of a user 205-*i*, and transmits content selection information to the content server 110. Then, if the service manager 210-*i* receives availability information from the content server 110, such as that relating to the content selection information it has provided to the content server, the service manager 210-*i* selects, from the received availability information, at least one UMD from among other UMDs included in the availability information and requests the selected UMD to transmit corresponding indexing blocks. In addition, it is the service manager 210-*i* that requests the content server 110 to transmit multimedia blocks specified by the indexing blocks. Alternatively or in addition, the service manager 210-*i* may receive corresponding indexing blocks and multimedia blocks instead of the availability information from the content server 110.

The user interface 220-*i* delivers an input from the user 205-*i* to the service manager 210.

The starting block storage unit 230-*i* stores a starting block of preset content.

The network interface 240-*i* stores a starting block input from the network 150 in the starting block storage unit 230-*i*, an input indexing block in the indexing block storage unit 250-*i*, and an input multimedia block in the multimedia content reproduction unit 260-*i* according to the control of the service manager 210-*i*.

The indexing block storage unit 250-*i* temporarily stores indexing blocks of a preset content.

The multimedia content reproduction unit 260-*i* delivers a starting block, indexing blocks, and multimedia blocks of a preset content to a UMD 200-*i*, according to the scheduling of the service manager 210-*i* and in a streaming format, by way of the network interface 240-*i* to the network 150.

Figure 3:
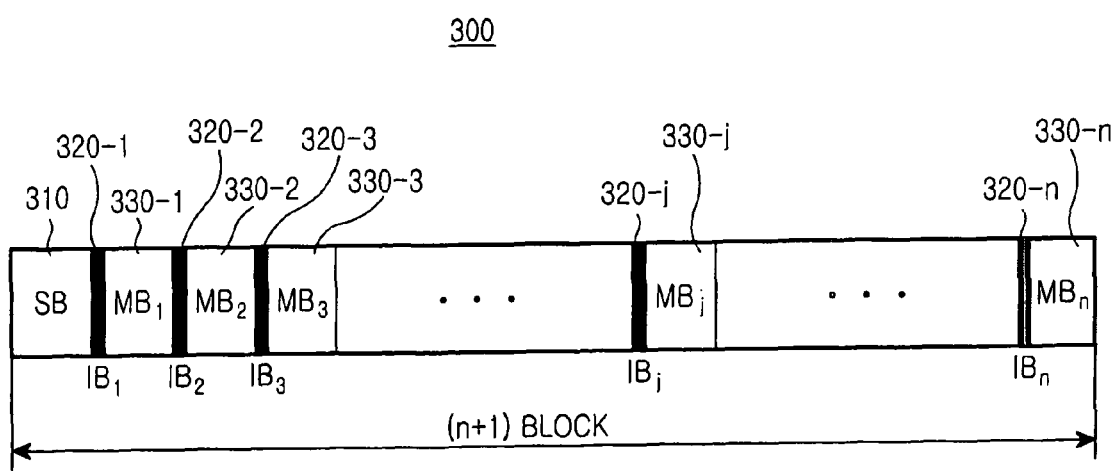
FIG. 3 is an exemplary format diagram of multimedia content transmitted in the system of FIG. 1.

Referring to FIG. 3, multimedia content 300 transmitted in the multimedia content streaming service system includes a starting block (SB) 310, n indexing blocks (IBs) 320-1 to 320-*n*, and n multimedia blocks (MBs) 330-1 to 330-*n*. The starting block 310 implies a part reproduced in the initial stage in which the UMD 200-*i* reproduces the multimedia content 300, the multimedia block 330-*j* refers to a part containing video and voice information, and the indexing block 320-*j* represents a part reproduced prior to reproduction of a corresponding multimedia block in a trick mode and containing position information regarding the corresponding multimedia block.

Figure 4:
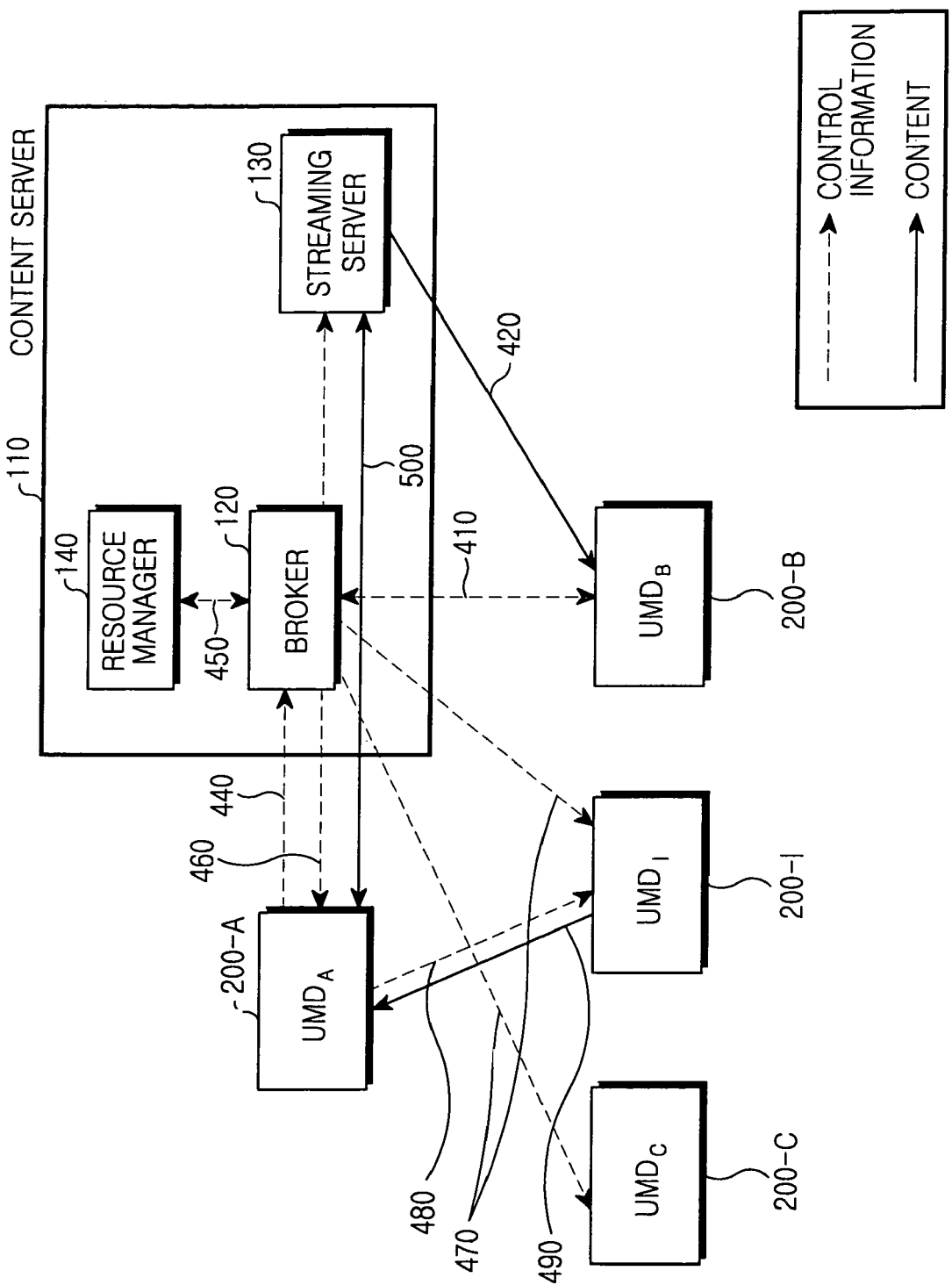
FIG. 4 is a flow diagram exemplary of the operation of the system of FIG. 1.
Figure 5:
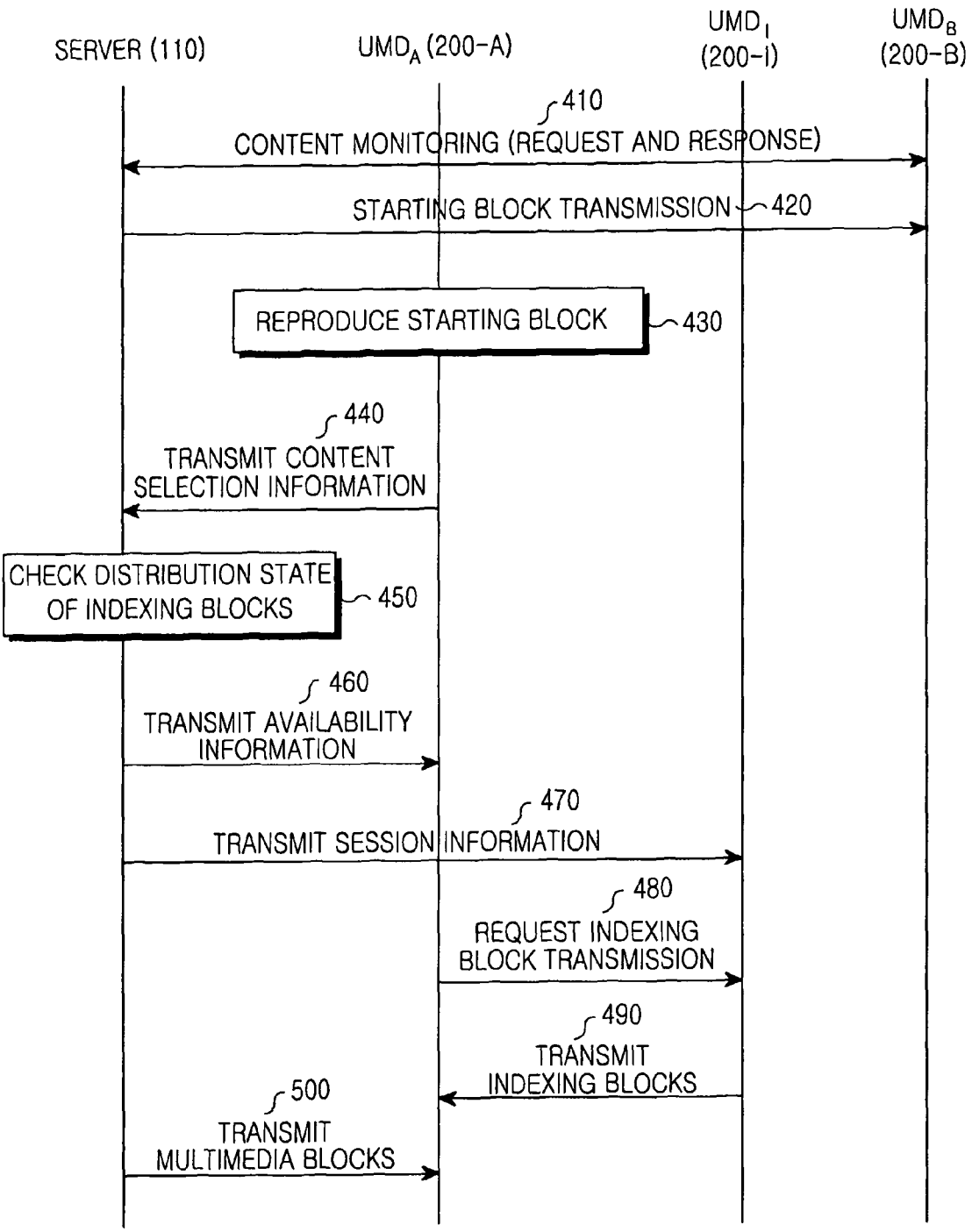
FIG. 5 is another flow diagram, related to that of FIG. 4, and exemplary of the operation of the system of FIG. 1.

FIG. 4 and FIG. 5 are views showing one method for streaming multimedia content by the streaming service system shown in FIG. 1. The method includes content monitoring (step 410), starting block transmission (step 420), transmission of content selection information (step 440), availability information transmission (step 460), session information transmission (step 470), indexing block transmission request (step 480), indexing block transmission step 490, and indexing block and multimedia block transmission (step 500).

The content monitoring (step 410) denotes a step in which the broker 120 of the content server 110 recognizes connection to the network 150 by a UMD 200-B having authority and monitors a storage state of the UMD 200-B for preset content. More particularly, the broker 120 requests of the UMD 200-B content information. Having received the request for the content information from the broker 120, the UMD 200-B transmits to the broker information (i.e., the content information) regarding a starting block and indexing blocks of the stored content. The broker 120 stores, in the resource manager 130, indexing block distribution information detected based on the content information received from the UMD 200-B.

The starting block transmission (step 420) denotes a step in which the broker 120 detects that the UMD 200-B does not store a starting block of a preset multimedia content and automatically transmits the starting block to the UMD 200-B. The UMD 200-B stores the starting block received from the content server 110 in its starting block storage unit.

The transmission of content selection information (step 440) denotes a step in which an UMD 200-A allows its multimedia content reproduction unit 260-*i* to reproduce a corresponding starting block stored in the starting block storage unit according to a request for content reproduction from a user of the UMD 200-A (step 430). UMD 200-A then transmits content selection information to the broker 120 for subsequent relaying to any of UMDs 200-C, 200-I, 200-B.

The availability information transmission (step 460) denotes a step in which the broker 120 checks an indexing block distribution state based on information stored in the resource manager 130 (step 450) and transmits availability information regarding corresponding indexing blocks to the UMD 200-A.

The session information transmission (step 470) denotes a step in which the broker 120 transmits session information (information about the UMD 200-A, which is to receive indexing blocks, and information about indexing blocks in waiting for transmission) to other UMDs (i.e., a UMD 200-C and a UMD 200-I) included in the availability information.

The indexing block transmission request (step 480) denotes a step in which the UMD 200-A requests the UMD 200-I, from among other UMDs included in the availability information, to transmit corresponding indexing blocks.

The indexing block transmission (step 490) denotes a step in which the UMD 200-I transmits indexing blocks requested through P2P communication with the UMD 200-A to the UMD 200-A.

The indexing block and multimedia block transmission (step 500) denotes a step in which the broker 120 transmits multimedia blocks requested by the UMD 200-A to UMD 200-A.

As described above, in a method for streaming a multimedia content according to the present invention, a starting block of preset multimedia is previously stored in a UMD, so that a delay that otherwise would be caused by buffering does not occur upon commencement of a streaming service. In addition, by inserting an advertisement into the starting block, it is possible to make an advertising impact on new content users 205-*i*.

Furthermore, in the method for streaming a multimedia content according to the present invention, indexing blocks can be shared between UMDs through P2P communication, thereby dividing server load. Accordingly, it is possible to improve serviceability of a content server and efficiently use network bandwidth.

In addition, in the method for streaming a multimedia content according to the present invention, indexing blocks can be previously stored in a UMD, making possible the reduction in buffering delay caused by the skip of contents. The method can be implemented as a computer software program, and as will be understood by a person of ordinary skill in the art, like all computer software programs, comprises machine executable code in a computer-readable medium for execution by the computer in order to perform the method of the claimed invention.

Also, since a streaming service is provided, the storage of entire contents in a UMD is avoided. It is therefore possible to lower the cost of the UMD and to obtain a protection effect for the contents.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for streaming over a network, from a content server to user multimedia devices (UMDs) connected to the content server through, said network, the method comprising the acts of:

1) monitoring storage states of the connected UMDs for a preset multimedia content including whether or not the connected UMDs contain a starting block and indexing blocks of the preset multimedia content, wherein the preset multimedia content includes the starting block being an initially reproduced part of the preset multimedia content, multimedia blocks containing video and voice information and the indexing blocks containing position information of the multimedia blocks and the multimedia blocks and the indexing blocks are disposed alternately; and 2) if a UMD of said UMDs does not store the starting block of said preset multimedia content, transmitting, automatically and without user intervention, the starting block to said UMD to permit reproduction of the preset multimedia content by the UMD without initial buffering;

wherein each of the indexing blocks that is alternately disposed represents a part reproduced prior to reproduction of a corresponding multimedia block in a fast forward or reverse mode and containing position information about the corresponding multimedia block is requested by and received through P2P communication and is reproduced only in a fast forward or reverse mode, wherein said preset multimedia content is a single multimedia content file in which the multimedia blocks and the indexing blocks are consecutively and alternately disposed; and wherein the act 1) includes the acts of:
a) requesting of said UMDs content information including information regarding whether or not the starting block and the indexing blocks of the preset multimedia content are stored in said UMDs; and
b) detecting an indexing distribution state among the UMDs based on the content information received as a result of the act a).

2. The method of claim 1, further comprising the act of receiving, in response to said requesting, at least some of said content information, said detecting occurring based on the content information received in said receiving.

3. The method of claim 2, wherein all of the content information requested in the act a) is received in said receiving.

4. The method of claim 2, wherein said detecting occurs by examining said content information received in said receiving.

5. A content server comprising a processor; and a memory; for streaming over a network to user multimedia devices (UMDs) connected to the content server through said network, said server being configured for performing the acts of:
1) monitoring storage states of the connected UMDs for a preset multimedia content including whether or not the UMDs contain a starting block and indexing blocks of the preset multimedia content without receiving a request from the UMDs, wherein the preset multimedia content includes the starting block being an initially reproduced part of the preset multimedia content, multimedia blocks containing video and voice information and the indexing blocks containing position information of the multimedia blocks and the multimedia blocks and the indexing blocks are disposed alternately;
2) if a UMD of said UMDs does not store the starting block of said preset multimedia content, transmitting, automatically and without user intervention, only the starting block to the UMD to permit reproduction of the preset multimedia content by the UMD without initial buffering; and
3) if the UMD of said UMDs requests the preset multimedia content, authorizing another of said UMDs storing the indexing block of the preset multimedia content to transmit in a P2P communication the indexing block to the content-requesting UMD and transmitting only the multimedia blocks of the preset multimedia content to the content-requesting UMD, the server being configured to perform at least one of the acts 1) and 3) automatically and without user intervention,
wherein each of the indexing blocks that is alternately disposed represents a part reproduced prior to reproduction of a corresponding multimedia block in a fast forward or reverse mode and containing position information, about the corresponding multimedia block is reproduced only in a fast forward or reverse mode, and wherein said preset multimedia content is a single multimedia content file in which the multimedia blocks and the indexing blocks are consecutively and alternately disposed.

6. The computer-based method as claimed in claim 5, wherein the act 1) includes the acts of:
a) requesting of said UMDs content information including information regarding whether or not the starting block and the indexing blocks of the preset multimedia content are stored in said UMDs; and
b) detecting an indexing distribution state among the UMDs based on the content information received from the UMDs.

7. The computer-based method as claimed in claim 5, wherein the act 3) includes the acts of:
c) transmitting, to said content-requesting UMD, availability information including information regarding one or more of said UMDs storing the indexing block of said preset multimedia content; and
d) authorizing at least one of the one or more UMDs to transmit said indexing block, of said preset multimedia content in response to a transmission request of said content-requesting UMD, said authorizing entailing transmitting session information including information regarding said content-requesting UMD to the at least one UMD included in the availability information.

8. A content server for streaming over a network to user multimedia devices (UMDs) connected to the content server through said network, said server being configured for performing the acts of:
1) monitoring storage states of the connected UMDs for a preset multimedia content including whether or not the UMDs contain a starting block and indexing blocks of the preset multimedia content without receiving a request from the UMDs, wherein the preset multimedia content includes the starting block being an initially reproduced part of the preset multimedia content, multimedia blocks containing video and voice information and the indexing blocks containing position information of the multimedia blocks and the multimedia blocks and the indexing blocks are disposed alternately;
2) if a UMD of said UMDs does not store the starting block of said preset multimedia content, transmitting, automatically and without user intervention, only the starting block to the UMD to permit reproduction of the preset multimedia content by the UMD without initial buffering; and
3) if the UMD of said UMDs requests the preset multimedia content, authorizing another of said UMDs storing the indexing block of the preset multimedia content to transmit in a P2P communication the indexing block to the content-requesting UMD and transmitting only the multimedia blocks of the preset multimedia content to the content-requesting UMD, the server being configured to perform at least one of the acts 1) and 3) automatically and without user intervention,
wherein each of the indexing blocks that is alternately disposed represents a part reproduced prior to reproduction of a corresponding multimedia block in a fast forward or reverse mode and containing position information about the corresponding multimedia block is reproduced only in a fast forward or reverse mode, and wherein said preset multimedia content is a single multimedia content file in which the multimedia blocks and the indexing blocks are consecutively and alternately disposed.

9. The server of claim 8, wherein the act 1) includes the acts of:
   a) requesting of said UMDs content information including information regarding whether or not the starting block and the indexing blocks of the preset multimedia content are stored in said UMDs; and
   b) detecting an indexing distribution state among the UMDs based on the content information received from the UMDs.

10. The server of claim 8, wherein the act 3) includes the acts of:
   c) transmitting, to said content-requesting UMD, availability information including information regarding one or more of said UMDs storing the indexing block of said preset multimedia content; and
   d) authorizing at least one of the one or more UMDs to transmit said indexing block of said preset multimedia content in response to a transmission request of said content-requesting UMD by transmitting session information including information regarding said content-requesting UMD to the at least one UMD included in the availability information.

11. A computer software product comprising machine executable code embodied within a non-transitory computer-readable medium and being operative to cause a machine to provide streaming over a network, from a content server to user multimedia devices (UMDs) connected to the content server through said network, said product comprising instructions for:
   1) monitoring storage states of the connected UMDs for a preset multimedia content including whether or not the connected UMDs contain a starting block and indexing blocks of the preset multimedia content without receiving a request from the UMDs, wherein the preset multimedia content includes the starting block being an initially reproduced part of the preset multimedia content, multimedia blocks containing video and voice information, and the indexing blocks containing position information of the multimedia blocks and the multimedia blocks and the indexing blocks are disposed alternately; and
   2) if a UMD of said UMDs does not store the starting block of said preset multimedia content, transmitting, automatically and without user intervention, the starting block to said UMD, wherein each of the indexing blocks that is alternately disposed represents a part reproduced prior to reproduction of a corresponding multimedia block in a fast forward or reverse mode and containing position information about the corresponding multimedia block is requested by and received through P2P communication and is reproduced only in a fast forward or reverse mode, and wherein said preset multimedia content is a single multimedia content file in which the multimedia block and the indexing blocks are consecutively and alternately disposed; and wherein said monitoring includes:
   a) requesting of said UMDs content information including information regarding whether or not the starting block and the indexing blocks of the preset multimedia content are stored in said UMDs; and
   b) detecting an indexing distribution state among the UMDs based on the content information received as a result of said requesting.

12. A user multimedia device (UMD) comprising a processor; and a memory; for receiving, from a content server, streamed content over a network, said device being configured for:
   receiving requests from the content server whether or not a starting block and indexing blocks of a preset multimedia content is contained in the UMD, wherein the preset multimedia content includes the starting block being an initially reproduced part of the preset multimedia content, multimedia blocks containing video and voice information and the indexing blocks containing position information of the multimedia blocks and the multimedia blocks and the indexing blocks are disposed alternately;
   storing the indexing block of the preset multimedia content; and transmitting only the indexing block to a content-requesting user multimedia device which requests the preset multimedia content, and content-requesting device being connected to said server through said network,
   wherein each of the indexing blocks that is alternately disposed represents a part reproduced prior to reproduction of a corresponding multimedia block is a fast forward or reverse mode and containing position information about the corresponding multimedia block is requested by and received through P2P communication and is reproduced only in a fast forward or reverse mode, and
   wherein said preset multimedia content is a single multimedia content file in which the multimedia blocks and the indexing blocks are consecutively and alternately disposed.

* * * * *